US012577161B2

(12) United States Patent
Perrino et al.

(10) Patent No.: US 12,577,161 B2
(45) Date of Patent: Mar. 17, 2026

(54) DRY MORTAR, IN PARTICULAR CEMENTITIOUS TILE ADHESIVE

(71) Applicant: SIKA TECHNOLOGY AG, Baar (CH)

(72) Inventors: Luigi Perrino, Nago Torbole (IT); Marco Camurati, Maranello (IT); Francesco Fazzini, Castelfranco Emilia (IT); Luz Granizo Fernandez, Madrid (ES)

(73) Assignee: SIKA TECHNOLOGY AG, Baar (CH)

( * ) Notice: Subject to any disclaimer, the term of this patent is extended or adjusted under 35 U.S.C. 154(b) by 633 days.

(21) Appl. No.: 17/783,740

(22) PCT Filed: Dec. 15, 2020

(86) PCT No.: PCT/EP2020/086215
§ 371 (c)(1),
(2) Date: Jun. 9, 2022

(87) PCT Pub. No.: WO2021/130062
PCT Pub. Date: Jul. 1, 2021

(65) Prior Publication Data
US 2023/0015398 A1 Jan. 19, 2023

(30) Foreign Application Priority Data
Dec. 23, 2019 (EP) ..................................... 19425099

(51) Int. Cl.
| | |
|---|---|
| *C04B 24/08* | (2006.01) |
| *C04B 14/06* | (2006.01) |
| *C04B 14/08* | (2006.01) |
| *C04B 14/22* | (2006.01) |
| *C04B 14/28* | (2006.01) |
| *C04B 16/06* | (2006.01) |
| *C04B 18/14* | (2006.01) |
| *C04B 28/04* | (2006.01) |
| *C04B 111/10* | (2006.01) |

(52) U.S. Cl.
CPC .............. *C04B 28/04* (2013.01); *C04B 14/06* (2013.01); *C04B 14/22* (2013.01); *C04B 14/28* (2013.01); *C04B 16/0625* (2013.01); *C04B 18/141* (2013.01); *C04B 2111/10* (2013.01)

(58) Field of Classification Search
CPC ......... C04B 28/04; C04B 14/06; C04B 14/22; C04B 14/28; C04B 16/0625; C04B 18/141; C04B 2111/10; C04B 2111/00672; Y02W 30/91
See application file for complete search history.

(56) References Cited

U.S. PATENT DOCUMENTS

| | | | | |
|---|---|---|---|---|
| 2010/0310846 A1* | 12/2010 | Berke | ..................... | C04B 28/04 427/427 |
| 2017/0066946 A1 | 3/2017 | Moyer, Jr. et al. | | |

FOREIGN PATENT DOCUMENTS

| | | | | | |
|---|---|---|---|---|---|
| CN | 104973832 A | * | 10/2015 | ............. | C04B 28/00 |
| CN | 106810170 A | | 6/2017 | | |
| DE | 199 16 117 A1 | | 10/2000 | | |
| EP | 2388242 A2 | * | 11/2011 | ............. | C04B 28/04 |
| WO | 2004/020358 A1 | | 3/2004 | | |
| WO | 2005/105697 A1 | | 11/2005 | | |
| WO | WO-2014094864 A1 | * | 6/2014 | ............. | C04B 28/04 |
| WO | 2020/225300 A1 | | 11/2020 | | |

OTHER PUBLICATIONS

Arbocel BWW 40_Data_Sheet (Year: 2024).*
CN_104973832_A_Machine_Translation (Year: 2015).*
WO_2014094864_Machine_Translation (Year: 2014).*

* cited by examiner

*Primary Examiner* — Amber R Orlando
*Assistant Examiner* — Anastasia A. Kuvayskaya
(74) *Attorney, Agent, or Firm* — Oliff PLC

(57) ABSTRACT

A dry mortar, in particular a cementitious tile adhesive using fibers. A method improves the slip resistance, the flexibility, and/or the consistency of a dry mortar mixed up with water. Moreover, a structure, in particular a floor, a wall or a ceiling, includes a cover element, in particular a tile, whereby the cover element is fixed to the structure with a dry mortar mixed up with water.

12 Claims, No Drawings

DRY MORTAR, IN PARTICULAR CEMENTITIOUS TILE ADHESIVE

TECHNICAL FIELD

The invention relates to a dry mortar, in particular a cementitious tile adhesive. Further objects of the invention are a method for improving the slip resistance, the flexibility and/or the consistency of a dry mortar mixed up with water. Moreover, the invention relates to a structure, in particular a floor, a wall or a ceiling, comprising a cover element, in particular a tile, whereby the cover element is fixed to the structure with a dry mortar mixed up with water.

BACKGROUND OF THE INVENTION

From decorative tiled surfaces to highly functional tiled wall and floor finishes, tiling is one of the most popular surface finishing techniques that are used to enhance the appearance and functionality of all types of buildings and facilities.

A tiled structure typically comprises (i) a substrate, e.g. a supporting structure, (ii) optionally an underlayment, (iii) an adhesive, (iv) tiles, e.g. in the form of ceramic tiles, stones and/or veneers, as well as (v) grouted joints and movement joints between the tiles. Thereby, tiles are fixed to the substrate with the tile adhesive. Depending on their composition, according to standard EN 12004-1:2017, tile adhesives are grouped into three main types: cementitious adhesives (C), dispersion adhesives (D) and reaction resin adhesives (R). Cementitious tile adhesives typically contain inter alia hydraulic cement, sand and fillers.

Cementitious adhesives used for tiling, also called cementitious tile adhesives or grouts, have to fulfill various requirements to be fit for purpose including open time, flexibility, and high tensile adhesive strength after hardening and also after heat storage and water immersion. However, also optimized application properties of cementitious tile adhesives are important as they render the tiling process much faster and much more reliable. Especially the sag resistance as well as the slip resistance are of high importance. A high slip resistance ensures that the tile adhesive holds an applied tile in place also in the uncured state of the tile adhesive. In other word, the tile is held in place directly after application without the need for additional fixation and further corrections are reduced to a minimum. This is especially important when laying large format tiles. There have thus been various attempts to improve slip resistance in cementitious tile adhesives.

EP 2 388 242 (The Dow Chemical Company) discloses a method for improving the slip resistance of a mortar formulation comprising a step of admixing a (meth)acrylic polymer and a cellulose ether.

WO 2004/020358 (Laticrete) discloses the use of a poly(p-ethylene terephthalamide) polymer fiber and/or a poly(m-ethylene terephthalamide) polymer fiber to improve the overall performance and especially the sag resistance of a cementitious thin set-mortar. An improvement of slip resistance is not disclosed.

There is a continued need for methods to improve the slip resistance of cementitious tile adhesives. Such methods should preferably not influence other important product properties, such that fulfillment of requirements according to international standards, e.g. EN 12004-1:2017, is still possible.

SUMMARY OF THE INVENTION

It is an objective of the present invention to provide an advantageous dry mortar which is in particular beneficial for use in tiled structures. The dry mortar thus is in particular a cementitious tile adhesive. Preferably, the dry mortar should comply with requirements of standard EN 12004-1:2017. In particular, the dry mortar should be easy to process, and, once mixed up with water, have a sufficient open time and have good adhesion to different kind of materials. At the same time, the dry mortar mixed up with water should have a low slip or a high slip resistance, and an improved flexibility.

Surprisingly, it has been found that the objective can be achieved by the features of claim 1. Thus, the core of the invention is a dry mortar, especially a cementitious tile adhesive, comprising or consisting of, in each case relative to the total dry weight of the dry mortar, a) 10-50 wt.-% of at least one cementitious binder,
b) 20-75 wt.-% of at least one aggregate, preferably sand,
c) 0.1-2 wt.-% of fibers with an average length of 0.1-1.1 mm, preferably 0.2-0.8 mm, more preferably 0.2-0.75 mm, especially 0.2-0.5 mm.

Preparing the dry mortar of the present invention is easy and safe. The components a) to c) and optionally further components are mixed in a dry state in any given order to yield a dry mortar. For application, e.g. in a tiling process, the dry mortar is mixed with an appropriate amount of water to yield a building material. The building material, which corresponds to the dry mortar mixed up with water, is ready to be used e.g. in a tiling process.

The building materials thus obtained, that is the inventive dry mortars mixed up with water, are easy to process. Especially, mixed building materials have a consistency, which allows for an application on vertical surfaces, surfaces with an inclination, and even overhanging areas without sag, slip and/or dripping.

As could be shown the dry mortars of the present invention, after being mixed up with water, are able to fulfill requirements according to criteria C1 or higher, and especially criteria C1TE S2, according to EN 12004-1:2017.

Furthermore, the cured building materials, that is the dry mortars of the present invention being mixed up with water and cured to a hardened material, have a high flexibility and a low shrinkage. Shrinkage is measured according to standard EN 12808-4.

Thus a very planar tiled surface can be realized.

Additional aspects of the invention are subject of further independent claims. Particularly preferred embodiments are outlined throughout the description and the dependent claims.

DETAILED DESCRIPTION

In the present context, the term "cementitious composition" is used to describe a composition comprising at least one cementitious binder and not comprising the fibers which are according to the present invention. A "dry mortar" or "cementitious tile adhesive", within the present context, is a dry mix comprising a cementitious composition and fibers which are according to the present invention. A dry mortar may thus be obtained by admixing fibers according to the present invention to a cementitious composition. Finally, a "building material", within the present context, refers to a dry mortar mixed up with water. A building material can be obtained by mixing a dry mortar of the present invention with water.

In the present invention the term "slip" refers to the slipping or sliding of a building material which is yet uncured, when a weight is applied thereto. The term "slip down" thus refers to the slipping or sliding of a building material which is yet uncured, on vertical surfaces or surfaces with an inclination when a weight is applied thereto. The term "slip resistance" within the present context refers to the resistance to slipping or sliding of a building material which is yet uncured, when a weight is applied thereto. A low slip of a building material which is yet uncured, is thus synonymous to a high slip resistance. The slip or slip resistance within the present context can be measured according to standard EN 12004-2:2017.

The slip or slip resistance is a rheological property of a building material which is yet uncured. A low slip, or high slip resistance, is desirable as it ensures that the uncured building material will hold a weight, e.g. a tile, in place directly after application. Fewer accessories (e.g. tapes, spacers, etc.) and less rework are thus needed, especially when tiling a surface.

Within the present context the term "sagging" refers to the slip or slip down of a building material which is yet uncured under its own weight.

Without wishing to be bound by theory it is believed that an increased slip resistance is associated with a high yield stress of the building material. The yield stress can, for example, be measured on a rheometer.

The term "flexibility" within the present context refers to the capacity of a building material to be deformed by stress, e.g. between a tile and the fixing surface, without damage to the installed surface. Flexibility within the present context is identical to transverse deformation as defined in standard EN 12004-2:2017 and can be measured as described therein.

In a first aspect, the present invention relates to a dry mortar, especially a cementitious tile adhesive, comprising or consisting of, in each case relative to the total dry weight of the dry mortar,
- a) 10-50 wt.-% of at least one cementitious binder,
- b) 20-75 wt.-% of at least one aggregate, preferably sand,
- c) 0.1-2 wt.-% of fibers with an average length of 0.1-1.1 mm, preferably 0.2-0.8 mm, more preferably 0.2-0.75 mm, especially 0.2-0.5 mm.

The dry mortar of the present invention is essentially free of water. "Essentially free" of means that an amount of water is below 1 wt.-%, preferably below 0.5 wt.-%, especially below 0.1 wt.-%, in each case relative to the total weight of the dry mortar.

According to a preferred embodiment, the dry mortar is a one-component composition. That means that all components a) to c) and optionally further components are intermixed. One-component compositions are in particular easy to handle and exclude the risk of a mix up or wrong dosing of individual components by users.

However, it is in principle possible to provide the dry mortar of the present invention as a two-component or even as a multi-component composition. A first component may, for example, be present in a first receptacle comprising the cementitious binder and the fibers. A second component, present in a second receptacle, may comprise the aggregates. Other distributions are possible as well. Two- or multi-component dry mortars allow, for example, for adjusting the dry mortar with regard to specific applications.

In the present context, the term "cementitious binder" in particular stands for substances that harden because of chemical reactions with water which produce hydrates. Preferably, the hydrates produced are not water-soluble. In particular, the hydration reactions of the cementitious binder take essentially place independently of the water content. This means that the cementitious binder can harden and retain its strength even when exposed to water, e.g. underwater or under high humid conditions.

Preferably, the cementitious binder comprises or consists of cement. Preferably, the cement is Portland cement and/or alumina cement and/or sulphoaluminate cement.

Preferred Portland cement can be any cement according to norm EN 197. In particular type CEM I, CEM II, CEM III, CEM IV, and/or CEM V. Especially CEM I. Portland cements according to other international standards, e.g. ASTM standards or Chinese standards, can be used as well. The term "alumina cement" stands in particular for a cement with an aluminium content, measured as $Al_2O_3$, of at least 30 wt.-%, especially at least 35 wt.-%, in particular 35-58 wt.-%. Preferably, the alumina cement is alumina cement according to standard EN 14647. Preferably, the sulphoaluminate cement is calcium sulphoaluminate cement.

According to one preferred embodiment, the cementitious binder consists of Portland cement, especially of CEM I.

A preferred amount of Portland cement in the dry mortar is 10-50 wt.-%, in particular 20-35 wt.-%, especially 25-30 wt.-%, in each case relative to the total dry weight of the dry mortar.

According to further embodiments, the cementitious binder comprises alumina cement and/or sulphoaluminate cement, preferably sulphoaluminate cement in addition to Portland cement. In particular, a proportion alumina cement and/or sulphoaluminate cement is from 1-15 wt.-%, in particular 3-10 wt.-%, especially, 4-7 wt.-%, in each case relative to the total dry weight of the cementitious binder.

According to embodiments, the cementitious binder comprises 10-49 wt.-%, in particular 20-35 wt.-%, especially 25-30 wt.-%, Portland cement and 1-15 wt.-%, in particular 3-10 wt.-%, especially, 4-7 wt.-%, sulphoaluminate cement, in each case relative to the total dry weight of the cementitious binder.

Moreover, the cementitious binder can optionally comprise or consist of latent hydraulic and/or pozzolanic binder materials. The term "latent hydraulic and/or pozzolanic binder materials" stands in particular for type II concrete additives with latent hydraulic and/or pozzolanic character according to EN 206-1. In particular, the latent hydraulic or pozzolanic binder material comprises or consists of slag, fly ash, silica fume, metakaolin and/or natural pozzolanes. Thereby, slag, in particular furnace slag is especially preferred.

Preferably, a proportion of the latent hydraulic and/or pozzolanic binder materials is from 0.5-20 wt.-%, in particular 2-10 wt.-%, especially 3-7 wt.-%, in each case relative to the total dry weight of the dry mortar.

According to a preferred embodiment, the cementitious binder comprises or consists of, in each case relative to the total dry weight of the cementitious binder:
- 60-99.5 wt.-%, preferably 70-98 wt.-%, especially 80-95 wt.-%, Portland cement, and
- 0.5-40 wt.-%, preferably 2-30 wt.-%, especially 5-20 wt.-%, latent hydraulic and/or pozzolanic binder materials, especially slag and/or fly ash.

According to another preferred embodiment, the cementitious binder comprises or consists of, in each case relative to the total dry weight of the cementitious binder:
- 45-98.5 wt.-%, preferably 70-95 wt.-%, especially 75-85 wt.-%, Portland cement,
- 1-30 wt.-%, preferably 3-25 wt.-%, especially, 5-15 wt.-%, sulphoaluminate cement, and
- 0.5-25 wt.-%, preferably 2-20 wt.-%, especially 5-15 wt.-%, latent hydraulic and/or pozzolanic binder materials, especially slag and/or fly ash.

A preferred amount of cementitious binder is 10-50 wt.-%, preferably 20-35 wt.-%, especially 25-30 wt.-%, in each case relative to the total dry weight of the dry mortar.

The dry mortar of the present invention comprises at least one aggregate. Aggregates can be any material that is non-reactive in the hydration reaction of cementitious binders. Aggregates can thus be any aggregate typically used for mortar and/or concrete. Typical aggregates are for example rock, crushed stone, gravel, slag, sand, especially quartz sand, river sand and/or manufactured sand, recycled concrete, glass, expanded glass, pumice, perlite, vermiculite, and/or fine aggregates such as ground limestone, and/or ground dolomite. Aggregates useful for the present invention can have any shape and size typically encountered for such aggregates. Aggregates useful for the present invention are as described for example in EN 12620:2008-07 and EN 13139:2015-07.

Aggregates typically are characterized by their particle size distribution which can be measured by sieve analysis as set out, for example, in standard EN 933.

According to embodiments, the particle size of the aggregates used in a dry mortar of the present invention is in the range of 0.1 μm to 32 mm and more. Aggregates with different particle sizes are preferably mixed in order to optimize the properties of the dry mortar. It is also possible to use aggregates of different chemical composition.

According to preferred embodiments, aggregates having particle sizes of not more than 8 mm, more preferably not more than 5 mm, still more preferably not more than 3.5 mm, most preferably not more than 2.2 mm, especially not more than 1.0 mm or not more than 0.4 mm are used in a dry mortar of the present invention.

A dry mortar of the present invention comprises 20-75 wt.-%, preferably 35-65 wt.-%, especially 40-60 wt.-%, in each case relative to the total dry weight of the dry mortar, of at least one aggregate.

According to a particularly preferred embodiment, the at least one aggregate comprises or consists of sand. Sand is a naturally occurring granular material composed of finely divided rock or mineral particles. It is available in various forms and sizes. Especially, the at least one aggregate consist of sand, in particular quartz sand, river sand, manufactured sand, for example from granite or limestone, or mixtures thereof. Suitable sands are described in standards ASTM C778 or EN 196-1.

According to embodiments, sand with a particle size of not more than 2 mm, preferably 1 mm, even more preferred of 0.85 mm, is used for a dry mortar of the present invention.

According to embodiments, sand with a bimodal particle size distribution is used. This can be achieved by mixing two sands with differing particle size distribution. Such granulometry enables an optimized overall particle size distribution for homogeneous mixing, good rheology of the fresh building material and high strength of the hardened building material.

A dry mortar of the present invention thus preferably comprises 20-75 wt.-%, more preferably 35-65 wt.-%, especially 40-60 wt.-%, in each case relative to the total dry weight of the dry mortar, of sand.

According to another embodiment, the dry mortar of the present invention additionally comprises at least one fine aggregate, especially ground carbonates of alkaline earth metals and/or expanded glass. In particular, the carbonates of alkaline earth metals are calcium carbonate, magnesium carbonate or mixed calcium/magnesium carbonates. It is particularly preferred that said ground calcium carbonate, magnesium carbonate or mixed calcium/magnesium carbonates and/or expanded glass have a particle size of not more than 0.3 mm, especially not more than 0.125 mm. It has been found that the fine aggregates can improve the processability of the dry mortar mixed with water and can increase the strength development.

A dry mortar of the present invention may thus comprise 20-75 wt.-%, more preferably 35-65 wt.-%, especially 40-60 wt.-%, in each case relative to the total dry weight of the dry mortar, of a mixture of sand and fine aggregate, especially ground calcium carbonate, magnesium carbonate or mixed calcium/magnesium carbonates and/or expanded glass.

The dry mortar of the present invention comprises fibers. Fibers within the present context can be natural fibers or synthetic fibers, especially synthetic fibers based on polyolefins. According to a particularly preferred embodiment, the fibers used in a dry mortar of the present invention are polyolefin fibers, especially polyethylene and/or polypropylene fibers.

According to particularly preferred embodiments, a dry mortar of the present invention thus comprises polyethylene and/or polypropylene fibers. It is, however, also possible to use other fibers based on polyolefines such as fibers based on polyethyleneterephthalate (PET) and composite fibers, especially of polyethylene and PET. It could be shown that fibers based on polyethylene and/or polypropylene gave better application properties as compared to natural fibers, especially cellulose fibers.

It is further preferred that a dry mortar of the present invention does not contain aramid fibers, especially poly(p-phenylene terephthalamide) and/or poly(m-phenylen terephthalamide) fibers. A dry mortar of the present invention is thus free of aramid fibers, especially poly(p-phenylene terephthalamide) and/or poly(m-phenylen terephthalamide) fibers.

Fibers useful within the present invention can be highly fibrillar. Especially, fibers suitable within the present context are branched, preferably highly branched. They can be used as a pulp product, as a fibril, or as a cut fiber. It is furthermore possible that fibers useful within the present context are chemically and/or mechanically modified, for example by embossing.

Fibers useful within the present context, especially polyethylene and/or polypropylene fibers, have a length of 0.1-1.5 mm, preferably 0.1-1.1 mm, more preferably 0.2-0.8 mm, still more preferably 0.2-0.75, especially 0.2-0.5 mm. This is significantly shorter compared to fibers known to be used in dry mortars and especially in cementitious tile adhesives. It has been found that the use of such short fibers lead to particularly low slip and high slip resistance as well as to a very smooth and creamy consistency of the dry mortar after being mixed up with water.

According to embodiments, fibers useful within the present context, especially polyethylene and/or polypropylene fibers, have a surface area of 1-10 m$^2$/g, preferably of 5-8 m$^2$/g and a diameter of 1-100 μm, preferably 10-40 μm. It is thus especially preferred within the present context to use fibers with an aspect ratio of 2-1'500, preferably 8-1'100, more preferably 15-800, especially 20-100. The aspect ratio is defined as the length of a fiber divided by its diameter.

Fibers are used in a dry mortar of the present invention with 0.1-2 wt.-%, preferably 0.2-1 wt.-%, especially 0.25-0.5 wt.-%. It has been found that at this dosage, the fibers lead not only to improved slip resistance and increased flexibility but also do not significantly increase the water demand of the dry mortar.

A dry mortar of the present invention advantageously further comprises additives common in the mortar and/or concrete industry such as plasticizers and/or superplasticizers, redispersible polymer, accelerators, retarders, air entrainers, stabilizers, viscosity modifiers, thickeners, water reducers, accelerators, retarders, water resisting agents, strength enhancing additives, fibres, blowing agents, pigments, corrosion inhibitors, etc. It can be advantageous to combine two or more of the mentioned additives in one dry mortar.

A redispersible polymer within the present context is a synthetic organic polymer which can easily be dispersed in water. Typically redispersible polymers can be produced by radical polymerization of monomers selected form the group consisting of ethylene, propylene, butylene, isoprene, butadiene, styrene, acrylonitrile, acrylic acid, methacrylic acid, esters of acrylic acid, esters of methacrylic acid, vinylchloride, and vinylesters such as vinylacetate, vinyllaureate, and vinylversatate. It is preferred that redispersible polymers are copolymers synthesized from two or more, preferably two, different monomers. The sequence of the copolymer can be alternating, blocked or random. Preferred redispersible polymers are copolymers of vinylacetate and ethylene, vinylacetate and ethylene and methylmethacrylate, vinylacetate and ethylene and vinylester, vinylacetate and ethylene and acrylic acid ester, vinylchloride and ethylene and vinyllaureate, vinylacetate and vinylversatate, acrylic ester and styrene, acrylic ester and styrene and butadiene, acrylic ester and acrylonitrile, styrene and butadiene, acrylic acid and styrene, methacrylic acid and styrene, styrene and acrylic acid ester, styrene and methacrylic acid ester.

The glass transition temperature (Tg) of said redispersible polymers can vary in a wide range. Tg of suitable redispersible polymers can be for example between $-50°$ C. and $+60°$ C., preferably between $-45°$ C. and $+35°$ C., more preferred between $-25°$ C. and $+15°$ C.

It is possible and in certain cases preferred to use mixtures of more than one of the said redispersible polymers in dry mortars of the present invention.

According to especially preferred embodiments, redispersible polymers are used in solid form such as redispersible polymer powders. Suitable redispersible powders are for example available from Wacker Chemie AG under the trade name Vinnapas or from Nouryon Chemicals AG under the brand name Elotex.

According to embodiments, the redispersible polymer, especially the redispersible polymer powder, is used in a dry mortar in an amount of 0.1-20 wt.-%, preferably 5-15 wt.-%, in each case relative to the total dry weight of the dry mortar.

A preferred dry mortar comprises or consists of, in each case relative to the total dry weight of the dry mortar,
20-50 wt.-% of Portland cement,
optionally 4-8 wt.-% latent hydraulic and/or pozzolanic binder materials, especially slag,
40-75 wt.-% of sand,
0.1-2 wt.-% of polyethylene and/or polypropylene fibers with a length of 0.2-0.75 mm, and
0.1-15 wt.-%, especially 5-12 wt.-%, of at least one redispersible polymer powder.

Another preferred dry mortar comprises or consists of, in each case relative to the total dry weight of the dry mortar,
20-30 wt.-% of Portland cement,
3-10 wt.-% of calcium sulphoaluminate cement,
optionally 4-8 wt.-% latent hydraulic and/or pozzolanic binder materials, especially slag and/or fly ash,
40-75 wt.-% of sand,
0.1-2 wt.-% of polyethylene and/or polypropylene fibers with a length of 0.2-0.8 mm, and 0.1-20 wt.-% of at least one redispersible polymer powder, and
0-5 wt.-%, especially 1-5 wt.-%, of one or more further additives.

Still another preferred dry mortar comprises or consists of, in each case relative to the total dry weight of the dry mortar,
20-50 wt.-% of Portland cement,
optionally 4-8 wt.-% latent hydraulic and/or pozzolanic binder materials, especially slag and/or fly ash,
35-59 wt.-% of sand,
1-16 wt.-% of ground calcium carbonate, magnesium carbonate or mixed calcium/magnesium carbonates and/or expanded glass,
0.1-2 wt.-% of polyethylene and/or polypropylene fibers with a length of 0.2-0.75 mm, and
1-15 wt.-% of at least one redispersible polymer powder.

Another aspect of the present invention relates to a method for producing a building material, comprising a step of mixing a dry mortar as described above with water.

Methods and devices for mixing a dry mortar with water are known to the person skilled in the art. It is for example possible to mix the dry mortar with water by means of hand held agitators, Hobart mixers, portable concrete mixers, mixing trucks, mixing buckets, paddle mixers, jet mixers, screw mixers, auger mixers, horizontal single shaft mixers, twin shaft paddle mixers, vertical shaft mixers, ribbon blenders, orbiting mixers, change-can mixers, tumbling vessels, vertical agitated chambers or air agitated operations. Mixing can be continuously, semi-continuously or batchwise. Continuous mixing offers the advantage of a high production speed.

Thereby, preferably, water is mixed with a dry mortar in a weight ratio of water to powder of 0.25-0.5, in particular 0.27-0.4, especially 0.30-0.35. A building material is thus obtained.

The building material may be applied by any means known to the person skilled in the art. According to one embodiment, the building material is applied by trowel, brush or roller. According to another embodiment, the building material is applied in a spray application. Application can be done manually or by a robotic system.

A further aspect of the present invention is a hardened structure obtainable by curing a building material.

Preferably, a building material according to the present invention exhibits one or more of the following properties (according to EN 12004-1/2:2017 and EN 1346, EN 1348):
Initial adhesion (after dry storage) $\leq 0.5$ MPa, especially $\leq 1.0$ MPa
Adhesion after water immersion $\leq 0.5$ MPa, especially $\leq 1.0$ MPa
Adhesion after heating $\leq 0.5$ MPa, especially $\leq 1.0$ MPa
Adhesion after freeze-thaw cycles $\leq 0.5$ MPa, especially $\leq 1.0$ MPa
Extended open time $\leq 0.5$ MPa after 10 minutes, especially after 20 minutes, preferably after 30 minutes
Transversal deformation $\leq 5$ mm
Preferably, the building material fulfils criteria C1 S1 or higher according to standard EN 12004-1:2017. More preferably the building material fulfils criteria C1E S2 or higher according to standard EN 12004-1:2017.

A further aspect of the present invention relates to a structure, in particular a floor, a wall or a ceiling, comprising a support element and a cover element, in particular a tile, whereby the cover element is fixed to the support element with a building material obtained by a method as described above. Especially, the building material is arranged between the support element of the structure and the cover element.

Preferably, a thickness of the building material in the structure is from 1-10 mm, in particular 2-7 mm, especially 3-5 mm.

Optionally, it is possible to have an additional primer layer and/or intermediate layer between the support element and the building material and/or between the building material and the cover element. This might further increase the adhesion between the support element and cover element.

In particular, the support element is a floor, a wall or a ceiling made essentially of mortar, concrete, bricks, plaster, metal, plastics and/or wood. Preferably, the cover element is a tile in the form of a ceramic tile, a stone and/or a veneer. It is especially preferred that the cover element is a large format tile. Large format tiles are tiles with one edge having a length of at least 35 cm, preferably tiles with a length and a width of at least 35 cm. Large format tiles can have different thickness, but a thickness of appr. 6 mm or 12 mm is especially preferred.

Another aspect of the present invention relates to a method for the production of a structure, whereby the dry mortar of the present invention is mixed with water, applied on a support element and covered with a cover element. Thereby, the support element and the cover element are defined as described above.

Preferably, the dry mortar mixed up with water is applied with a thickness from 1-10 mm, in particular 2-7 mm, especially 3-5 mm.

An additional aspect of the present invention relates to the use of the dry mortar as herein described. Especially, the dry mortar is used as a tile adhesive, in particular in a process to fix tiles on a support element, e.g. on a wall, ceiling and/or floor.

In yet another aspect the present invention relates to a method for improving the slip resistance and/or the flexibility of a building material, said method comprising the steps of a) obtaining a dry mortar by admixing fibers with an average length of 0.1-1.1 mm, preferably 0.2-0.8 mm, more preferably 0.2-0.75 mm, especially 0.2-0.5 mm to a dry cementitious composition comprising 10-50 wt.-% of at least one cementitious binder and 20-75 wt.-% of at least one aggregate, preferably sand, in each case relative to the total dry weight of the dry mortar, and b) mixing the dry mortar obtained in step a) with water in a weight ratio of water to powder of 0.25-0.5.

In still another aspect the present invention relates to a method for achieving a creamy consistency of a building material, said method comprising the steps of a) obtaining a dry mortar by admixing fibers with an average length of 0.1-1.1 mm, preferably 0.2-0.8 mm, more preferably 0.2-0.75 mm, especially 0.2-0.5 mm to a dry cementitious composition comprising 10-50 wt.-% of at least one cementitious binder and 20-75 wt.-% of at least one aggregate, preferably sand, in each case relative to the total dry weight of the dry mortar, and b) mixing the dry mortar obtained in step a) with water in a weight ratio of water to powder of 0.25-0.5.

Preferably, the fibers used in any of the methods to improve the slip resistance, to increase the flexibility, and/or to achieve a creamy consistency of a building material are polyethylene and/or polypropylene fibers. Preferably such fibers are used in said methods in an amount of 0.1-2 wt.-%, relative to the total dry weight of the dry mortar. A creamy consistency is important as it is one important factor for good workability and easy application of a building material.

In still another aspect the present invention relates to a method for reducing the shrinkage of a building material, said method comprising the steps of a) obtaining a dry mortar by admixing fibers with an average length of 0.1-1.1 mm, preferably 0.2-0.8 mm, more preferably 0.2-0.75 mm, especially 0.2-0.5 mm to a dry cementitious composition comprising 10-50 wt.-% of at least one cementitious binder and 20-75 wt.-% of at least one aggregate, preferably sand, in each case relative to the total dry weight of the dry mortar, and b) mixing the dry mortar obtained in step a) with water in a weight ratio of water to powder of 0.25-0.5.

Said method for the reduction of the shrinkage of a building material is especially useful where said building material is applied with a high layer thickness. A high layer thickness means that the building material is applied with a layer thickness of >1 mm, preferably >2 mm, especially >3 mm, but not more than 10 mm. Shrinkage is measured according to standard EN 12808-4. Preferably shrinkage is <2 mm/m.

Further advantageous configurations of the invention are evident from the exemplary embodiments.

EXAMPLES

Example 1

The following table 1 gives an overview of the tested dry mortars. All numbers given in table 1 are wt.-%. Dry mortar formulations Reference 1 and 2 (not according to the invention) and Example 1 (according to the invention) were prepared by intermixing the dry components until visually homogeneous.

TABLE 1

| Dry mortar formulations | | | |
| --- | --- | --- | --- |
| | Reference 1 | Reference 2 | Example 1 |
| Portland cement*[1] | 29 | 29 | 29 |
| Quartz sand*[2] | 50 | 50 | 50 |
| Redispersible polymer powder*[3] | 11 | 11 | 11 |
| Fine aggregate*[4] | 6 | 6 | 6 |
| Slag*[5] | 4 | 4 | 4 |
| Fiber | | 0.3*[6] | 0.3*[7] |

*[1]CEM I 52.5 R white
*[2]medium grain size: 0.183 mm; 0% > 0.5 mm, 0.1% < 0.063 mm
*[3]based on flexible copolymer of vinylacetate, ethylene, and methylmethacrylate
*[4]expanded glass 0.1-0.3 mm
*[5]Ground granulated blast furnace slag (Blaine fineness 4'000-4'800 cm$^2$/g; 35.2% SiO2, 10.4% Al2O3, 41.9% CaO, 7.4% MgO)
*[6]cellulose fibre (length: 0.2-0.5 mm)
*[7]PE fibre (length: 0.2-0.5 mm)

The dry mortars were subsequently mixed with water at a weight ratio of water to powder of 0.31 to obtain processable building materials.

The following table 2 gives an overview of results measured on the processable building materials before and after hardening. All measurements were done according to EN 12004-2:2017.

TABLE 2

| | Requirement of EN 12004-1 | Reference 1 | Reference 2 | Example 1 |
|---|---|---|---|---|
| | | Results | | |
| Consistency and application properties | | Creamy not spreadable | Crumbly not spreadable | Creamy, not sticky easily spreadable |
| Slip [mm] | <0.5 | 1.6 | n.a. | 0.10 |
| Deformation [mm] | ≥5 | 5.4 (@ 5 Newton) | n.a. | 6.8 (@ 5 Newton) |
| TAS* @ 24 h [MPa] | >0.5 | n.m. | n.a. | 0.53 |
| TAS* @ 7 d [MPa] | | n.m. | n.a. | 1.94 |
| TAS* @ 28 d [MPa] | none | n.m. | n.a. | 2.00 |
| TAS* after heat ageing [MPa] | >0.5 | n.m. | n.a. | 3.21 |
| TAS* after water immersion [MPa] | >0.5 | n.m. | n.a. | 1.15 |
| TAS* after 30 min open time [MPa] | >0.5 | n.m. | n.a. | 1.32 |

TAS*: tensile adhesion strength
n.m.: not measured
n.a.: not available as material cannot be applied It can be seen from the above table 2 that Example 1, which is accordance with the present invention, is able to fulfill the requirements of EN 12004-1:2017 for cementitious tile adhesives of type C1ET S2. Especially, Example 1 shows a very low slip and a high flexibility. Reference 1, which is not according to the present invention, is not able to pass the requirement for slip and has a lower flexibility as compared to the Example 1.

Inventive Example 1 shows the desired creamy consistency without stickiness and is easily spreadable and thus application properties of Example 1 are good. Reference 1 also shows a creamy consistency, but is not spreadable. Thus, the addition of fibers according to the invention improves the application properties. Reference 2, which is not according to the present invention did show a crumbly consistency and it was not possible to apply Reference 2 to a support.

Example 2

The following table 3 gives an overview of the tested dry mortars. All numbers given in table 3 are wt.-%. Dry mortar formulations of Example 2 (according to the invention) and References 3 and 4 (not according to the invention) were prepared by intermixing the dry components until visually homogeneous. Example 1 which is according to the invention is the same as Example 1 above.

TABLE 3

| | Dry mortar formulations | | |
|---|---|---|---|
| | Example 2 | Reference 3 | Reference 4 |
| Portland cement*1 | 29 | 29 | 29 |
| Quartz sand*2 | 50 | 50 | 50 |
| Redispersible polymer powder*3 | 11 | 11 | 11 |

TABLE 3-continued

| | Dry mortar formulations | | |
|---|---|---|---|
| | Example 2 | Reference 3 | Reference 4 |
| Fine aggregate*4 | 6 | 6 | 6 |
| Slag*5 | 4 | 4 | 4 |
| Fiber | 0.3*8 | 0.3*9 | 0.3*10 |

*1CEM I 52.5 R white
*2medium grain size: 0.183 mm; 0% > 0.5 mm, 0.1% < 0.063 mm
*3based on flexible copolymer of vinylacetate, ethylene, and methylmethacrylate
*4expanded glass 0.1-0.3 mm
*5Ground granulated blast furnace slag (Blaine fineness 4'000-4'800 cm²/g; 35.2% SiO2, 10.4% Al2O3, 41.9% CaO, 7.4% MgO)
*8PE fibre (length: 0.75-1.05 mm)
*9PE fibre (length: 1.3-2.0 mm)
*10cellulose fibre Arbocel BWW 40 (average length: 0.2 mm)

The dry mortars were subsequently mixed with water at a weight ratio of water to powder of 0.31 to obtain processable building materials.

Workability has been evaluated on a scale from 1 (excellent workability) to 5 (not workable) by considering the consistency, ease of troweling, spreadability, and coverage of the processable building material during application.

Slip was measured as in example 1.

Wettability was measured similar to standard EN 1347: 2007. For better comparison of results, the performance of Example 1 (according o the invention) is set to 100% and other results are expressed in relation thereto.

The following table 4 gives an overview of results measured on the processable building materials.

TABLE 4

| | Example 2 | Reference 3 | Reference 4 | Example 1 |
|---|---|---|---|---|
| | | Results | | |
| Consistency and application properties | poorly spreadable | not spreadable | Sticky not spreadable | Creamy, not sticky easily spreadable |
| Workability | 4 | 5 | 5 | 1 |
| Slip [mm] | >0.5 | n.a. | n.a. | 0.10 |
| Wettability | 80% | 70% | 65% | 100% | n.m.: not measured
n.a.: not available as material cannot be applied

As can be seen from the results in table 4, a mortar composition comprising PE fibers which are in accordance with the present invention gives a much better workability, lower slip, and better wettability as compared to mortar compositions using either longer PE fibers (Reference 3) or cellulose fibers of comparable length (Reference 4). The use of PE fibres with a length of 0.2-0.5 mm gives a better performance as compared to the use of PE fibres with a length of 0.75-1.05 mm (compare Examples 1 and 2).

The invention claimed is:

1. A dry mortar comprising, in each case relative to the total dry weight of the dry mortar,
    a) 10-50 wt.-% of at least one cementitious binder, wherein the at least one cementitious binder comprises, in each case relative to the total dry weight of the cementitious binder:
        60-99.5 wt.-%, Portland cement, and
        0.5-40 wt.-%, latent hydraulic and/or pozzolanic binder materials,
    b) 20-75 wt.-% of at least one aggregate, wherein aggregate is a material that is non-reactive in a hydration reaction of cementitious binders, c) 0.1-2 wt.-% of fibers with an average length of 0.2-0.5 mm, wherein the aspect ratio of the fibers is between 2-20, and wherein the fibers are polyethylene and/or polypropylene fibers.

2. A dry mortar according to claim 1, wherein the dry mortar does not contain aramid fibers.

3. A dry mortar according to claim 1, further comprising at least one redispersible polymer in an amount of 0.1-20 wt.-%, in each case relative to the total dry weight of the dry mortar.

4. A method for producing a building material comprising a step of mixing a dry mortar as claimed in claim 1 with water in a weight ratio of water to the dry mortar of 0.25-0.5.

5. A building material obtained in a method as claimed in claim 4, wherein it fulfills the criteria C1 S1 or higher, according to standard EN 12004-1:2017.

6. A structure comprising a support element and a cover element, whereby the cover element is fixed to the support element with a building material obtained by a method as claimed in claim 4.

7. A dry mortar according to claim 1, wherein the at least one aggregate is selected from the group consisting of: rock, crushed stone, gravel, slag, sand, recycled concrete, glass, expanded glass, pumice, perlite, vermiculite, ground limestone, ground dolomite, and a combination thereof.

8. A dry mortar comprising, in each case relative to the total dry weight of the dry mortar,
  a) 20-50 wt.-% of Portland cement,
  b) 4-8 wt.-% latent hydraulic and/or pozzolanic binder materials,
  c) 35-59 wt.-% of sand,
  d) 1-16 wt.-% of ground calcium carbonate, magnesium carbonate or mixed calcium/magnesium carbonates and/or expanded glass,
  e) 0.1-2 wt.-% of polyethylene and/or polypropylene fibers with a length of 0.2-0.5 mm, wherein the aspect ratio of the fibers is between 2-20, and
  f) 1-15 wt.-% of at least one redispersible polymer powder.

9. A method for improving the slip resistance and/or the flexibility of a building material comprising the steps of
  a) obtaining a dry mortar by admixing fibers with an average length of 0.2-0.5 mm to a dry cementitious composition comprising 10-50 wt.-% of at least one cementitious binder and 20-75 wt.-% of at least one aggregate, in each case relative to the total dry weight of the dry mortar, and
  b) mixing the dry mortar obtained in step a) with water in a weight ratio of water to the dry mortar of 0.25-0.5, wherein the at least one cementitious binder comprises, in each case relative to the total dry weight of the cementitious binder:

60-99.5 wt.-%, Portland cement, and
0.5-40 wt.-%, latent hydraulic and/or pozzolanic binder materials,
wherein aggregate is a material that is non-reactive in a hydration reaction of cementitious binders, and
wherein the aspect ratio of the fibers is between 2-20, and wherein the fibers are polyethylene and/or polypropylene fibers.

10. A method as claimed in claim 9, wherein the fibers are admixed in an amount of 0.1-2 wt.-%, relative to the total dry weight of the dry mortar.

11. A method for achieving a creamy consistency of a building material comprising the steps of
  a) obtaining a dry mortar by admixing fibers with an average length of 0.2-0.5 mm to a dry cementitious composition comprising 10-50 wt.-% of at least one cementitious binder and 20-75 wt.-% of at least one aggregate, in each case relative to the total dry weight of the dry mortar, and
  b) mixing the dry mortar obtained in step a) with water in a weight ratio of water to powder of 0.25-0.5,
  wherein the at least one cementitious binder comprises, in each case relative to the total dry weight of the cementitious binder:
  60-99.5 wt.-%, Portland cement, and
  0.5-40 wt.-%, latent hydraulic and/or pozzolanic binder materials,
  wherein aggregate is a material that is non-reactive in a hydration reaction of cementitious binders, and
  wherein the aspect ratio of the fibers is between 2-20, and wherein the fibers are polyethylene and/or polypropylene fibers.

12. A method for reducing the shrinkage of a building material, the method comprising the steps of
  a) obtaining a dry mortar by admixing fibers with an average length of 0.2-0.5 mm to a dry cementitious composition comprising 10-50 wt.-% of at least one cementitious binder and 20-75 wt.-% of at least one aggregate, in each case relative to the total dry weight of the dry mortar, and
  b) mixing the dry mortar obtained in step a) with water in a weight ratio of water to the dry mortar of 0.25-0.5,
  wherein the at least one cementitious binder comprises, in each case relative to the total dry weight of the cementitious binder:
  60-99.5 wt.-%, Portland cement, and
  0.5-40 wt.-%, latent hydraulic and/or pozzolanic binder materials,
  wherein aggregate is a material that is non-reactive in a hydration reaction of cementitious binders, and
  wherein the aspect ratio of the fibers is between 2-20, and wherein the fibers are polyethylene and/or polypropylene fibers.

* * * * *